United States Patent [19]

Hughes et al.

[11] Patent Number: 4,657,681

[45] Date of Patent: Apr. 14, 1987

[54] METHOD OF CONVERTING ORGANIC MATERIAL INTO USEFUL PRODUCTS AND DISPOSABLE WASTE

[76] Inventors: William L. Hughes, Rte. 1 Box 641; Rama G. Ramakumar, 2623 N. Husband, both of Stillwater, Okla. 74074

[21] Appl. No.: 725,661

[22] Filed: Apr. 22, 1985

[51] Int. Cl.[4] .............................................. C02F 11/12
[52] U.S. Cl. .................................... 210/769; 210/770; 210/774; 210/806
[58] Field of Search ............... 210/769, 770, 774, 768, 210/771, 806

[56] References Cited

U.S. PATENT DOCUMENTS

| | | | |
|---|---|---|---|
| 3,716,474 | 2/1973 | Hess et al. ....................... | 210/774 X |
| 3,887,461 | 6/1975 | Nickerson et al. ............. | 210/769 X |
| 4,321,150 | 3/1982 | McMullen .......................... | 210/769 |

Primary Examiner—Tom Wyse
Attorney, Agent, or Firm—Head Johnson Stevenson

[57] ABSTRACT

A method of converting organic materials into useful products and disposable waste including the steps of shredding the organic material into particles, mixing the organic particles with water to obtain a pumpable slurry, raising the temperature and pressure of the slurry to about 300° to 500° C. and about 8000 to 12,000 psig in a reaction vessel to cause the slurry to hydropyrolyize, separating the products of hydropyrolysis to remove gases from the liquids and solids, separating the liquids and solids, treating the separated gases and liquids to extract hydrocarbon components therefrom and using the solids as fuel directly.

8 Claims, 1 Drawing Figure

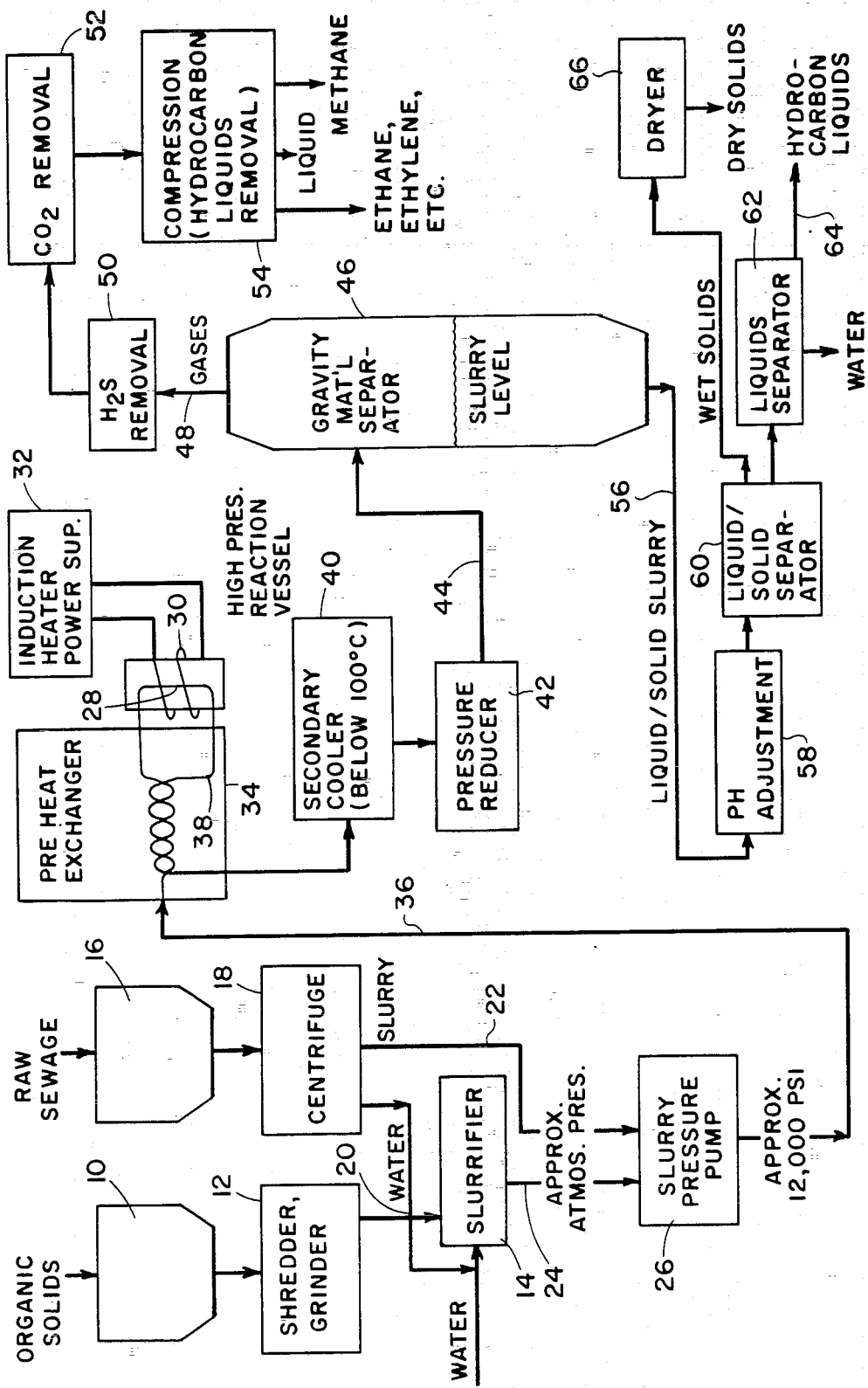

METHOD OF CONVERTING ORGANIC MATERIAL INTO USEFUL PRODUCTS AND DISPOSABLE WASTE

SUMMARY OF THE INVENTION

A serious problem facing society today is the disposal of organic waste, such as household and industrial trash. Others have suggested, and facilities are in use, wherein trash is separated into metal, glass, plastic and burnable components. The combustible portion of the trash is burnt to produce heat useable for industrial purposes such as generation of electricity, refining oil products, etc. This system functions satisfactorily if the area wherein the trash is collected is adjacent a facility which can readily use the heat generated. In most areas of the world there is no direct commercial means of utilizing a central source of heat produced by burning trash and in such locations the trash is normally merely buried in landfills. Such landfills are detrimental to the environment, and areas where landfills can be successfully operated are becoming scarce.

The present invention is directed towards a means of converting organic material, such as derived from trash or sewage sludge, into useful products.

The invention is based upon the concept that an organic slurry subjected to sufficient pressure and temperature undergoes hydropyrolysis in which a substantial portion of the organic material is converted to hydrocarbon products. These products can be separated out as solids, liquids and gases and utilized as fuels. The solids remaining are greatly reduced in volume and are useful as a solid fuel, often consisting primarily of powdered carbon.

The organic material is first shredded into particles and the particles mixed with water to provide a pumpable slurry. In some instances the organic particles may have water already mixed, such as discharge from a cattle feeding lot, and in which case excess water is removed, such as in a centrifuge. In any event, the organic material is treated and mixed with water in such a way that it can be readily pumped. The slurry is pumped through a reaction vessel which preferably is in the form of a relatively long and relatively small diameter tube. The pressure and temperature of the slurry is raised in the reaction tube to between 300° and 500° C. at a pressure of from 8000 to 12,000 psig. In this temperature and pressure range the organic materials undergo hydropyrolysis within a very short time, that is, almost instantaneously.

The products of the hydropyrolysis step are conveyed to a cooler and pressure reducer. The temperature is reduced to below 100° C. and the pressure is reduced to that which can be safely accommodated in a gravity separator. Within the gravity separator the gases are extracted and treated for removal of hydrocarbon content. The hydrocarbon gases are in the form of methane, ethane, ethylene, etc. These gases are readily useable as fuels, or as raw materials for chemical processes.

The liquid and solids from the gravity separator are passed through a liquid/solids separator. The liquids which are mostly water, are treated for removal of the small amount of hydrocarbon liquids present. These are substantially in the nature of crude oil. This hydrocarbon liquid can be refined in the same way that crude oil is refined to produce gasoline, kerosene, diesel fuel, lubricating oil and lighter components including hydrocarbon gases.

The solids remaining are in the form of char or ash materials and often consist primarily of powdered carbon, and other useful products. They are, in their dried state useable as solid fuel.

DESCRIPTION OF THE DRAWING

The drawing is a flow diagram showing the various steps employing in practicing the method of this invention for converting organic material into useful products and disposable waste.

DESCRIPTION OF THE PREFERRED EMBODIMENT

Referring to the drawing, the flow diagram illustrates a preferred method of practicing the invention. Organic solids, such as residential and commercial waste, with metal, glass and plastic portions removed, are stored in a bin 10. The waste from storage bin 10 is passed through a shredder-grinder 12 wherein the waste is chopped into particles having a preselected maximum size. While the maximum size can vary significantly according to the other parameters of the method, the particles should be chopped to a dimension which does not exceed approximately ¼". From the shredder-grinder 12 the particles are fed to a slurrifier 14 wherein they are mixed with water to provide a pumpable slurry.

When the organic waste is in the form of an existing slurry, such as raw sewage, or the wash down from a feeding lot or the like, the raw sewage is passed into a storage tank 16 and through a centrifuge 18 wherein excess water is removed. The excess water by way of conduit 20 may be used to provide the water, or at least a portion of it, to slurrifier 14. Slurry passes by way of conduit 22 from centrifuge 18 and conduit 24 from slurrifier 14 to a slurry pump 26.

All of the steps taken up in the introduction of the organic slurry into pump 26 are at or near atmospheric pressure. In pump 26 the pressure of the slurry is raised to between 8,000 psig and 12,000 psig. To achieve hydropyrolysis the organic slurry must be raised in both pressure and temperature. Therefore, the slurry raised to the preselected pressure by pump 26 is subjected to a temperature in a high pressure reaction vessel 28. While vessel 28 may be of various constructions, a preferred embodiment of the invention is that wherein the reaction vessel is in the form of a long, small diameter tube. Further, the heat applied to the slurry within the reaction vessel 28 may be applied in a variety of ways. One way is by use of an induction coil 30 energized by an induction heater power supply 32.

One of the objectives of the invention is the provision of a system which is economically efficient and for this reason conservation of energy within the system is important. A significant amount of energy can be saved by the employment of a preheat exchanger 34 in which the slurry from pump 26, as supplied by conduit 36, receives heat exchanged from the slurry after it has passed through reactor vessel 28. While heat exchangers operate in a variety of ways, one method is to intimately contact a portion of conduit 36 with a portion of the conduit 38 by which the slurry is conveyed from reaction vessel 28.

Within reaction vessel 28 the organic material when the critical pressure and temperature is reached, undergoes a chemical reaction which is accomplished in a very short time; that is, almost instantaneously The fact that this reaction is attainable under these pressures and temperatures has been demonstrated by R. Ramakumar and William L. Hughes in a paper entitled "An Experimental Investigation of the Aqueous Pyrolysis of Biomass" presented to Frontiers of Power Conference held at Oklahoma State University in 1979, and published in the Conference Proceedings. The reaction converts the organic material into lower level hydrocarbons through a process known as hydropyrolysis or also known as aqueous pyrolysis. It is believed that the reaction converts the organic material into hydrocarbons in much the way that naturally occurring crude oil and gas have been converted from organic materials in the evolutionary processes of the earth, the organic materials being trapped in sediments and within the earth and subjected to sufficient pressure and temperature by shifts in the earth structure to achieve the oil and gas deposits forming the basis of todays petroleum industry.

The products of hydropyrolysis, after passing through the heat exchanger 34 are further cooled in a secondary cooler 40 to reduce the temperature below 100° C., that is, below the boiling point of water at atmospheric pressures. The cooled material is passed through a pressure reducer 42 so that it can be handled by pipes, vessels, etc. at lower pressure levels. The output of the pressure reducer 42 at conduit 44 is an organic slurry which has undergone hydropyrolysis and which now consists essentially of water, char, carbon dioxide and hydrocarbons. The composition of the hydrocarbons resulting from the hydropyrolysis depends upon the pressures and temperatures of the reaction as well as on the exact composition of the organic materials.

From conduit 44 the hydropyrolyized material is fed into a gravity separator 46. The end product contains about 20 to 35 percent methane, 40 to 60 percent carbon dioxide and small quantities of ethylene and ethane, the percentages being based on that of the dry weight of the organic material input. The gases are removed at the top through conduit 48 and are treated such as by passing them through a $H_2S$ removal station 50 and a $CO_2$ removal station 52. The remaining gas, which is essentially hydrocarbons, is compressed to permit extraction of liquid hydrocarbon components in a compression station 54. Non-liquefied components, being primarily methane, can be separately removed and the methane constitutes a product having significant commercial and easily useable product. The methane gas can be used directly as a fuel, or it can be utilized as a component in gas distribution for residential, commercial and industrial customers or as a chemical plant raw material. Other hydrocarbons of lesser quantities such as ethane, ethylene and so forth may be also removed and utilized as components of fuel gas or for chemical process raw materials.

In the gravity separator 46 the liquids and solids resulting from the hydropyrolysis settle to the bottom and are drawn out as a slurry through a conduit 56. Generally speaking the liquid and solid components of the slurry from conduit 56 are separated and hydrocarbons extracted. This can be achieved in a number of ways. In the method illustrated the slurry is first treated at a ph adjustment station 58 so that the acidity of the slurry can be neutralized to permit easier treatment of the components and to make the ultimate waste products environmentally acceptable.

After ph adjustment the slurry is passed through a liquids/solid separator station 60. The liquid component goes through a second separator step 62 wherein water is extracted. This water, though not shown on the drawing, can be used as water input to the slurrifier 14 so that the water employed in the system is substantially continuously recycled. From the liquid separator 62 hydrocarbon liquids are recovered and carried by conduit 64 for further processing.

The solids from separator 60 are fed to a dryer 66 wherein remaining water is driven off providing dry solids which are primarily powdered carbon and ash. There can be used as a fuel directly.

The fuels produced, which includes methane gas, may be employed to provide much of the heat energy necessary in the system, including that required for drier 66, so that the entire system should be energy efficient compared to other processes.

The flow diagram of the method is merely representative of a method of practicing the invention and it can be seen that many alternate processes may be employed and that some of the process steps illustrated can be eliminated and others combined.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of converting organic waste material in the form of organic solids consisting of household and industrial trash into useful products and disposable water, comprising:
   (a) shredding the organic material into pre-selected maximum size particles;
   (b) mixing water with the shredded particles to obtain a pumpable slurry;
   (c) increasing the temperature of the slurry to about 300° to about 500° C. and the pressure to about 8000 to about 12,000 PSIG in a reaction vessel to cause the slurry to hydropyrolyize;
   (d) conveying the products of hydropyrolysis to a separator wherein gases are extracted from the liquids and solids;
   (e) separating the liquids and solids; and
   (f) separating hydrocarbon liquids from the separated liquid (residue; and
   (g) drying the solids for use as a fuel).

2. A method of converting organic waste material in the form of organic solids consisting of household and industrial trash into useful products and disposable waste according to claim 1 including heat exchanging the slurry from step (b) with the hydropyrolyized slurry from step (d).

3. A method of converting organic waste material in the form of organic solids consisting of a household and industrial trash into useful products and disposable waste according to claim 1 wherein step (c) is carried out in a reaction vessel in the form of a long small diameter tube.

4. A method for converting organic waste material in the form of organic solids consisting of household and industrial trash into useful products and disposable waste according to claim 1 wherein step (c) is carried out in a reaction vessel in the form of a long, small diameter tube and wherein heat is applied by an induction heater.

5. A method of converting organic waste material in the form of organic solids consisting of household and industrial trash into useful producs and disposable waste according to claim 1 including, after step (c), of cooling and pressure reducing the hydropyrolyized slurry before it is conveyed to a separator in step (d).

6. A method of converting organic waste material in the form of organic solids consisting of household and industrial trash into useful products and disposable waste according to claim 1 wherein in step (d) the products of hydropyrolysis are separated in a gravity separator.

7. A method of converting organic waste material in the form of organic solids consisting of household and industrial trash into useful products and disposable waste according to claim 1 wherein the gases from step (d) are treated for extraction of hydrocarbon components.

8. A method for converting organic waste material in the form of organic solids consisting of household and industrial trash into useful products and disposable waste according to claim 1 including, after step (f) of drying the separated solids for use as a fuel.

* * * * *